Figure 1:
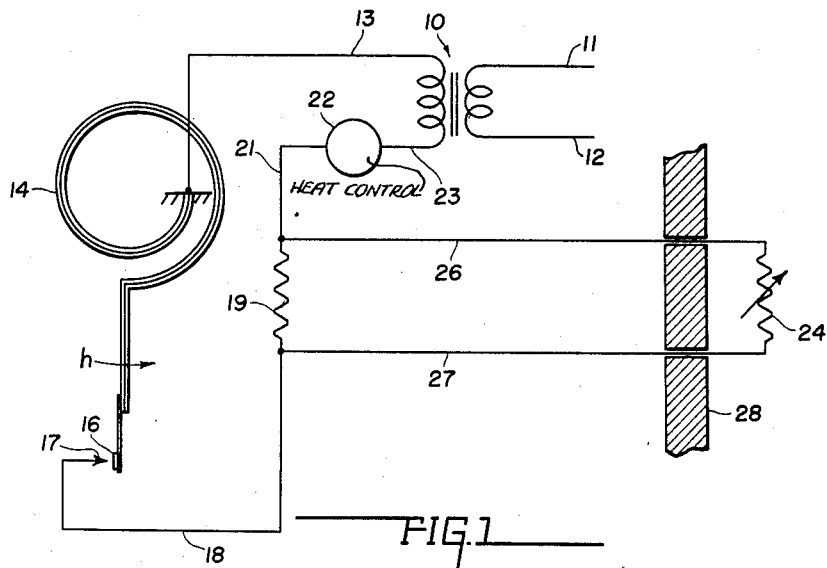

Jan. 27, 1959 K. G. KREUTER 2,870,965
COMPENSATED ANTICIPATING THERMOSTAT
Filed Oct. 3, 1956

INVENTOR.
KENNETH G. KREUTER
BY
Maurice A. Weikart
ATTORNEY

United States Patent Office 2,870,965
Patented Jan. 27, 1959

2,870,965

COMPENSATED ANTICIPATING THERMOSTAT

Kenneth G. Kreuter, Goshen, Ind., assignor to Penn Controls Incorporated, Goshen, Ind., a corporation of Indiana Application October 3, 1956, Serial No. 613,625

4 Claims. (Cl. 236—68)

This invention relates generally to heat anticipating thermostats and particularly to a thermostat in which the heat anticipating feature is independent of the current in the control circuit into which the thermostat is connected.

In domestic heating, to provide accurate control of room temperature, it has been customary to utilize an auxiliary or anticipating electric heater, mounted adjacent the thermostat bimetal and connected in series with the thermostat contacts. The utility of this arrangement is illustrated and described in Shafer Patent 1,583,496. As shown in the Shafer patent, the most convenient way to obtain the small amount of heat (of the order of .1 watt) to be applied to the thermostat bimetal is to connect an electric heater in series with the thermostat contacts. Under these conditions the heat output of the anticipating heater is a function of the current flowing in the thermostat circuit.

When thermostats are sold with matching controlled components, gas valves or oil burner primary controls, the control circuit current is known and an anticipating heater may be chosen having the proper resistance to provide the desired amount of heat output. Many thermostats, however, are sold as replacements for older, less accurate units and are, consequently, integrated into control circuits containing controlled components of various manufacturers having differing current requirements. It is obvious that in this situation the proper heater size for a particular installation cannot be determined in advance of the particular installation. In the past this difficulty has been met by providing thermostats in which the anticipating heater is removable so that the proper heater, matching the current in the control circuit into which the thermostat is to be connected, can be inserted at the installation of the heating equipment. In order that the thermostat can be universally used in various installations and as a replacement unit, the interchangeable heater type requires that the dealer stock a large group of heaters, of various electrical resistance, and the installer must have with him at the installation a representative group of these heaters so that he can match the thermostat to the current requirement of the control circuit. The inconvenience in this arrangement is obvious. Other attempts at the solution to this problem have been the use of anticipating heaters energized independently of the control circuit, consequently requiring additional wiring extending from the furnace to the thermostat, and the use of somewhat complicated range shifting apparatus for matching an over-sized heater to the control circuit, as exemplified in Malone Patent 2,687,610.

In the present invention the current through the anticipating heater is controlled by a negative temperature coefficient resistor connected in shunt with the heater. The negative temperature coefficient resistor is of the self-heating type (the thermal energy affecting its resistance is generated by the current passing through the resistor) and is thermally insulated from the anticipating heater. Thus, as the temperature of the negative coefficient resistor increases, its resistance decreases until a point of equilibrium is reached. Depending on the rate of change of the resistance of the negative coefficient resistor with its increased temperature (in other words, the slope of the resistance-temperature characteristic curve of the particular negative coefficient resistor used), the thermal output of the anticipating heater can be held constant or can be slightly decreased with an increased current in the control circuit. Slightly decreasing the thermal output of the anticipating heater upon an increase in control circuit current can be useful in compensating for the effect of prolonged heating of the bimetal and other thermostat parts during heavy heating load operation of the heating plant.

A primary object of the present invention is to provide an anticipating type thermostat which is universally adaptable to various control circuits without matching the anticipating heater to the control circuit current.

A further object of the present invention is to provide a thermostat of the anticipating type which compensates for the control error introduced by prolonged internal heating of the thermostat parts under heavy heating plant load conditions.

To the accomplishment of the above and related objects the invention may be embodied in the forms illustrated in the accompanying drawings, attention being called to the fact that, however, the drawings are illustrative only, and that specific changes may be made in the construction illustrated and described so long as the scope of the appended claims are not violated.

Figure 1 represents a schematic drawing of the circuit components of the present invention.

Figure 2:
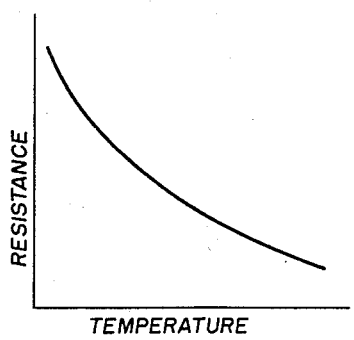

Figure 2 generally represents a typical resistance-temperature characteristic curve of a negative temperature coefficient resistor.

Referring to Figure 1 there is shown at 10 a control transformer of the usual type which provides low voltage power for the control circuit. The primary winding of transformer 10 is connected to the customary power supply leads 11 and 12. One side of the secondary coil of the transformer 10 is connected, by means of a wire 13 to a thermally responsive member 14, heredisclosed as a bimetal strip. The free end of the bimetal strip carries a movable electrical contact 16 adapted to cooperate with a fixed contact 17. Contact 17 is connected, by means of wire 18 to one side of an electrical heater 19. The heater 19 is mounted adjacent the member 14 so that the thermal energy generated by the heater 19 affects the temperature of, and consequently the position of, the member 14. The other side of the heater 19 is connected by means of a wire 21 to a heating means actuating device 22, which is also connected by means of wire 23 to the other side of the secondary coil of the transformer 10. The device 22, it will be understood, may take the form of a control valve controlling the flow of gas to a gas-fired heating plant or may be the electromagnetic operator for a relay switch controlling the operation of an oil burner in an oil-fired heating plant. In any event, the device 22, when energized, starts the heating plant in operation to supply heat to the room or enclosure the temperature of which is to be controlled. A negative temperature coefficient resistor 24 is connected in parallel with the heater 19 by means of wires 26 and 27. The resistor 24 is thermally insulated from the heat produced by the heater 19. The thermal shielding means may take any conventional form and is schematically illustrated at 28 in Figure 1. One convenient means for providing this thermal shielding locates the resistor 24 on the rear face of the enclosure or room wall, the member 14 and heater 19 being mounted on the front face of the room wall.

Operation

With the power input lines 11 and 12 connected to a suitable source of power and with the room or enclosure temperature above the control point of the thermostat, contacts 17—16 will be open as shown in Figure 1. As the room temperature falls below the thermostat control point the member 14 will close contacts 17—16, energizing the room heating control means 22 through the electrical heater 19. Energization of the control means 22 will start the operation of the heating plant and heat will be supplied to the room. As may be seen in Figure 2, the resistor 24, which is of the self-heating type, will initially have a relatively high resistance. Because, however, at least a small portion of the current through the contacts 17—16 will flow through the resistor 24, it will be heated somewhat and its resistance will decrease permitting more current to flow through the resistor 24 until a point of equilibrium is reached at which the heat loss from the resistor 24 just equals the heat produced by it. The resistor 24 is sized so that after this equilibrium point is reached the circuit through the heater 19 will produce the proper amount of thermal energy to provide a proper anticipating effect on the member 14 in the manner disclosed in the Shafer Patent, mentioned supra.

If the thermostat is integrated into a control circuit which must utilize a somewhat higher control circuit current, the additional current passing through resistor 24 will lower its resistance, thereby compensating the heating effect of the heater 19 on the member 14 for the increased current in the control circuit. It will be noted that within a range of control circuit current values, the action of the resistor 24 serves to hold the thermal output of the heater 19 relatively constant. The same thermostat can thus be used in control circuits having various control circuit current values.

Resistor 24 can be sized, as to its resistance-temperature characteristic, so that it decreases the thermal output of the heater with an increase in control circuit current. This action can serve to compensate for the slightly increased tendency of the member 14 to open contacts 16—17 prematurely caused by the heating of the member 14 due to the control current flowing through it for prolonged periods during heavy heating plant load conditions.

It will be understood that the invention herein described may be modified over that disclosed; the invention is to be limited only as defined in the following claims.

What is claimed is:

1. A thermostat for controlling the temperature of an enclosure comprising a thermally responsive member, contacts operated by said responsive member from a closed position to an open position upon an increase in the enclosure temperature, an electric heater mounted adjacent said responsive member and adapted to locally affect its temperature, said heater being electrically connected in series with said contacts and thereby tending to drive said responsive member into contact-open position and a negative temperature coefficient resistor of the self-heating type thermally insulated from said heater and connected in shunt therewith for controlling the thermal energy generated by said heater, whereby the thermal output of said heater is maintained substantially constant independently of the magnitude of the current through said contacts.

2. A thermostat for controlling the temperature of an enclosure comprising bimetal member, contacts operated by said bimetal member from a closed position to an open position upon the existence of a predetermined temperature in the enclosure, an anticipating electrical heater mounted adjacent said bimetal member and adapted to be traversed by the current through said contacts thereby tending to drive said bimetal member into contact-open position, and means for shunting around said anticipating heater a portion of the current through said contacts dependent on the magnitude of said current, said means comprising a negative temperature coefficient resistor of the self-heating type connected in parallel with said anticipating heater and thermally insulated therefrom, whereby the thermal output of said heater is maintained substantially constant independently of the magnitude of the current through said contacts.

3. A thermostat for controlling the temperature of an enclosure comprising a thermally responsive member, contacts operated by said thermally responsive member from closed position to an open position upon the existence of a predetermined temperature in the enclosure, an electric heater mounted adjacent said responsive member and adapted to be traversed by the current through said contacts in closed position thereby tending to drive said responsive member into contact-open position, and means for shunting around said anticipating heater a portion of the current through said contacts dependent on the magnitude of said current, said last mentioned means comprising a negative temperature coefficient resistor of the self-heating type connected in parallel with said anticipating heater and thermally insulated therefrom, whereby the thermal output of said heater is maintained substantially constant independently of the magnitude of the current through said contacts.

4. A circuit for controlling a heating system from a single temperature responsive means comprising, a circuit having a source of power, a room thermostat, a heating means controller, and a heat anticipator network all serially connected; said heat anticipator network comprising an electrical heater and a negative temperature coefficient resistor of the self-heating type parallel connected, said heater being adapted to influence the room thermostat and said negative temperature coefficient resistor being thermally insulated from said heater, whereby the thermal output of said heater is maintained substantially constant independently of the magnitude of the current through said heating means controller.

References Cited in the file of this patent

UNITED STATES PATENTS

| | | |
|---|---|---|
| 1,094,733 | Lyle | Apr. 28, 1914 |
| 1,997,559 | Hajek | Apr. 9, 1935 |
| 2,156,082 | Crago | Apr. 25, 1939 |
| 2,300,092 | Baum | Oct. 27, 1942 |
| 2,339,635 | Hall | Jan. 18, 1944 |
| 2,628,034 | Ray | Feb. 10, 1953 |